United States Patent Office 3,215,909
Patented Nov. 2, 1965

3,215,909
REGENERATIVE ELECTRIC CAPACITOR
Hermann Schill and Fritz Gaenge, Munich, Germany, assignors to Siemens & Halske Aktiengesellschaft, Berlin and Munich, Germany, a corporation of Germany
Filed Feb. 1, 1961, Ser. No. 86,517
Claims priority, application Germany, Apr. 22, 1960, S 68,166
3 Claims. (Cl. 317—258)

This invention is concerned with a regenerative electric capacitor. The object of the invention is to provide a regenerative electric capacitor utilizing a dielectric which has favorable dielectric but normally poor regenerative properties. This object is realized by employing at least one coating consisting of two thin regenerative metal layers between which is disposed an insert made of a substance containing in the molecule at least ten percent of the oxidation agent or medium required for its complete conversion to stable oxidation products.

While there are many capacitor dielectrics known for non-regenerative capacitors, only definite dielectrics, for example, such as paper, cellulose derivatives and polyethyleneterephthalate have become known for use in connection with regenerative capacitors. The reason resides above all in the fact that the phenomena attending the regenerative process have been largely unknown until now and, accordingly, no generally valid rule could be supplied for the construction of such capacitors. Research with respect to these phenomena led to the following results:

The regenerative properties in the case of regenerative capacitors are substantially codetermined by the chemical structure of the dielectric, the atoms with strongly oxidative properties, for example, oxygen and fluorine, which are present in the molecule, being particularly important for the regenerative process. A definite amount of an oxidation medium or agent is required in the regenerative process for the complete conversion of the dielectric to stable oxidation products, for example, $CO_2$ and $H_2O$. The percentage of this amount, which is present in the molecule, is referred to as oxidation balance. It is particularly the oxidation balance of the dielectric layer extending directly adjacent to the metallic coating, which is decisive for the proper and satisfactory, that is to say, for the unobjectionable course of the regenerative process, since the insulation path is upon breakdown or burn-out mainly formed by the burn-out area the radius of which may perhaps be one hundred times greater than the thickness of the dielectric layer.

It has been found that the regenerative process takes an unobjectionable course in the case of dielectrics with an oxidation balance greater than ten percent, for example, in the case of paper, acetylcellulose, ethylcellulose, polytetrafluoroethylene, polyethyleneterephthalate. If the oxidation balance is lower than ten percent, for example, in the case of polycarbonate, polystyrol, polyethylene, polyvinylcarbazol, there will appear carbonization, resulting in lowered insulation values and in part in short circuits. Accordingly, these substances cannot be employed for regenerative capacitors despite their good dielectric properties and in part high temperature stability.

In order to make it nevertheless possible to use substances having good dielectric properties but poor regenerative properties, for the construction of regenerative capacitors, the proposal has been made to coat such a dielectric with a thin layer of a material which has an oxidation balance greater than ten percent. The disadvantage of this expedient is, however, that the layer made of the material which gives off oxygen, forms part of the operatively effective dielectric. Accordingly, either materials are used for this purpose which also have otherwise good dielectric properties, for example, a relatively small loss angle, or it will have to be tolerated that the improvement with respect to regenerative properties is obtained at the expense of a diminishing of the remaining electrical properties of the capacitor.

It has recently been shown that it is not necessary to arrange in the dielectric field the material which gives off oxygen but that it is likewise possible to place it as it were into the interior of the capacitor coating, that is, into the field-free area, thereby avoiding its influence with respect to the dielectric values of the capacitor. The invention therefore proposes a regenerative capacitor wherein at least one of the coatings consists of two thin conductively connected regenerative metal layers between which is positioned an insert made of a material containing in the molecule the oxidation agent or medium which is required for its complete conversion into stable oxidation products. The insert is thus in the field-free space and does not adversely influence the properties of the operatively effective dielectric.

An additional advantage resides in the possibility of metallizing at least part of the metal layers upon the inserts positioned in the field-free space, instead of on dielectrically effective layers, and the metal peaks which are formed by the filling of the pores with metal particles will thus extend into the field-free space, where they remain completely harmless, instead of extending into the dielectric where they diminish the breakdown strength and the loss angle.

The various objects and features of the invention will appear from the description which is rendered below with reference to the accompanying schematic drawing.

Figure 1:
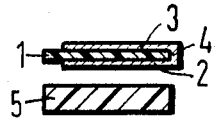
FIG. 1 shows in schematic manner a strip provided with thin regenerative metal coatings, which with a dielectric strip forms a unit.

In FIG. 1, numeral 1 indicates a strip made of a material requiring regenerative properties and provided with thin regenerative metal coatings 2 and 3 which if desired may be conductively interconnected by means of a bridging member 4. The conductive connection 4 may be produced coincident with the metallization of the coatings 2 and 3, or after the metallization thereof, or after wrapping the metallized foil to form a capacitor packake, so as to provide for the contacting.

The strip shown in FIG. 1, which is metallized on both sides may be processed as a coating with desired dielectrics to form regenerative wrapped capacitors.

It is however also possible to provide the capacitor dielectric with the regenerative coating and its insert which can be as a mechanical unit. In FIG. 1, numeral 5 indicates a dielectric strip or sheet provided with a first metallized layer 2 upon which is disposed the oxygen yielding insert in the form of a varnish layer 1 which is about one micron thick. Upon the latter is metallized another metal layer 3 which may be connected with the layer 2 by the conductive member 4 coincident with the metallizing or after wrapping the unit to form a capacitor package, as described before.

If the dielectric which is to be wrapped with the coating according to FIG. 1, for example, the dielectric strip 5 is made of a shrinkable synthetic material, for example, prestretched polystyrol, the resulting capacitor may be shrunk by tempering and thus solidified so as to increase the capacitance constant.

As illustrated in FIGS. 2 to 5, the invention may be particularly advantageously applied in connection with known methods of producing thin-foil capacitors. Carrier foils made of paper or synthetic material, which are if desired pretreated so as to obtain suitable adhesive properties, are thereby provided with varnish layers and, for example, by vaporization with a metal coating. The varnish layer is peeled off from the carrier foil and wrapped to form a thin-foil capacitor package.

Figure 2:
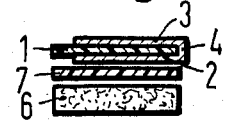
FIGS. 2 to 5 illustrate how the invention may be advantageously applied in the production of thin-foil capacitors.

In FIG. 2, such a carrier foil 6 is provided with a varnish layer 7 of desired dielectric strength, upon which is placed a first metal coating 2, thereupon in similar manner as the first varnish layer 7, a second varnish layer 1, preferably with a thickness of about one micron and made of a material adapted to give off oxygen, and thereafter a second metal layer 3.

Figure 3:
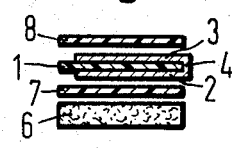

As indicated in FIG. 3, upon the second metal layer 3 may be provided a further varnish layer 8 consisting advantageously of the same material and having the same thickness as the varnish layer 7.

Figure 4:

Upon peeling the layers from the carrier foil 6, there will be obtained an arrangement, as indicated in FIG. 4, comprising a first varnish layer 7, and coatings of metal 2 and 3 which embrace or enclose an insert 1. If a second varnish layer 8 is utilized, there will result an arrangement such as indicated in FIG. 5.

Figure 5:
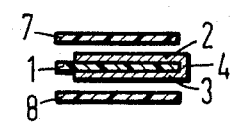
Figure 6:
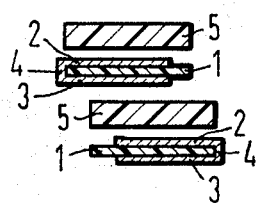
FIGS. 6 and 7 show sectional views of layers of wrapped capacitors made respectively of laterally displaced layer foils constructed according to FIGS. 1 and 4.
Figure 7:
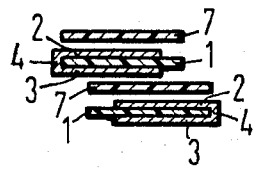
Figure 8:
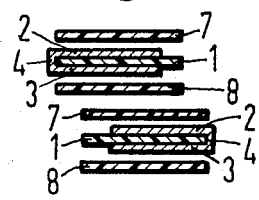
FIG. 8 represents a sectional view of a layer of a two-layer capacitor.

FIG. 6 shows in sectional view a layer of a wrapper capacitor made of laterally displaced layer foils such as indicated in FIG. 1. FIG. 7 shows in similar manner in sectional view a layer of a wrapped capacitor made of laterally displaced layer foils according to FIG. 4. There is obtained in this manner a capacitor with a single layer dielectric. By wrapping the layer foils shown in FIG. 5, peeled off from the carrier 6 according to FIG. 3, there is in similar manner obtained a two-layer capacitor, a layer of which is indicated in FIG. 8. The lateral displacement of the multi-layer foils may be omitted if desired.

The layers or coatings shown in FIGS. 4 and 5 can be combined with further dielectric strips. The varnish layers 7 and 8 are in such a case made particularly thin. Capacitors made in accordance with FIGS. 7 and 8, in which the varnish layers 7 and 8 serve as the sole dielectric, excel by particularly high space capacitance.

Changes may be made within the scope and spirit of the appended claims which define what is believed to be new and desired to have protected by Letters Patent.

We claim:

1. A regenerative electric capacitor comprising a dielectric sheet of non-regenerative material, a conductive coating disposed on said sheet comprising two conductively connected regenerative thin metal layers, and a thin intermediate layer disposed between said metal layers in the area free of the dielectric field, said thin intermediate layer comprising a substance which contains in the molecule at least ten percent of the oxidation agent required for its complete conversion to stable oxidation products.

2. A capacitor as defined in claim 1, wherein a further dielectric sheet is disposed upon the outermost metal layer of said coating.

3. A capacitor as defined in claim 1, wherein said dielectric sheet comprises a varnish layer.

References Cited by the Examiner

UNITED STATES PATENTS

| 2,593,829 | 4/52 | Arledter et al. | 317—260 |
| 2,930,714 | 3/60 | Netherwood | 317—260 |
| 2,969,488 | 1/61 | Foster | 317—260 |

FOREIGN PATENTS

| 705,353 | 3/54 | Great Britain. |
| 803,132 | 10/58 | Great Britain. |

JOHN F. BURNS, *Primary Examiner.*

SAMUEL BERNSTEIN, JOHN P. WILDMAN,
*Examiners.*